Feb. 14, 1967         MASAYUKI FUTAMATA         3,303,647
HYDRAULICALLY OPERATED POWER SYSTEM
Filed June 3, 1965

INVENTOR.
MASAYUKI FUTAMATA
BY
ATTORNEYS

United States Patent Office 3,303,647
Patented Feb. 14, 1967

3,303,647
HYDRAULICALLY OPERATED POWER SYSTEM
Masayuki Futamata, Ota-ku, Tokyo-to, Japan, assignor to Kabushiki Kaisha Komatsu Seisakusho, Tokyo-to, Japan, a joint-stock company of Japan
Filed June 3, 1965, Ser. No. 461,012
Claims priority, application Japan, June 6, 1964, 39/44,704; June 15, 1964, 39/47,170
7 Claims. (Cl. 60—53)

This invention relates generally to hydraulically operated power systems and more particularly to hydraulic power systems of the type in which a hydraulic motor such as a turbine is driven by hydraulic fluid supplied thereinto from a hydraulic pump driven by a suitable prime mover.

Although power systems of the above type are well known, conventional control means therefor have been complicated in construction and operation.

It is a primary object of this invention to provide improvements in the control means for driving and stopping the hydraulic motor of a power system of the above type.

More specifically, an object of this invention is to provide control means for controlling the operation of the hydraulically operated power system, in which the arrangement and construction are simple, and the operation is easy and reliable.

Another object of this invention is to provide means which, in the case of use of a hydraulic speed-changer as a speed-changing device of machines such as powered vehicles, is capable of cutting off or, depending on the necessity, of maintaining the transmission of power similarly as in the case when a conventional mechanical clutch is used.

Still another object of the invention is to provide means whereby, when a lever, for controlling the speed of the pump driving prime mover, is actuated and placed in its minimum speed position, no torque is developed in the hydraulic motor.

A further object is to provide means which includes a control switch provided on the speed control lever of the prime mover for driving the hydraulic pump, whereby control of fluid pressure for power transmission and control of rotational speed of said prime mover can be accomplished interrelatedly by the manipulation of a single lever.

Furthermore, in the case in which a hydraulic power system is applied to a vehicle, and it is desired to cut off the power transmission by placing the system into neutral state when necessary, it is sometimes difficult to obtain the neutral state by operating only a variable volume pump. This invention, however, provides means whereby the neutral state can be readily obtained by operating, by foot, a switching valve inserted in the hydraulic circuit.

Other and further objects of this invention will be obvious by reference to the illustrative embodiments which will be described hereinafter in connection with the accompanying drawings, in which.

Figure 1:
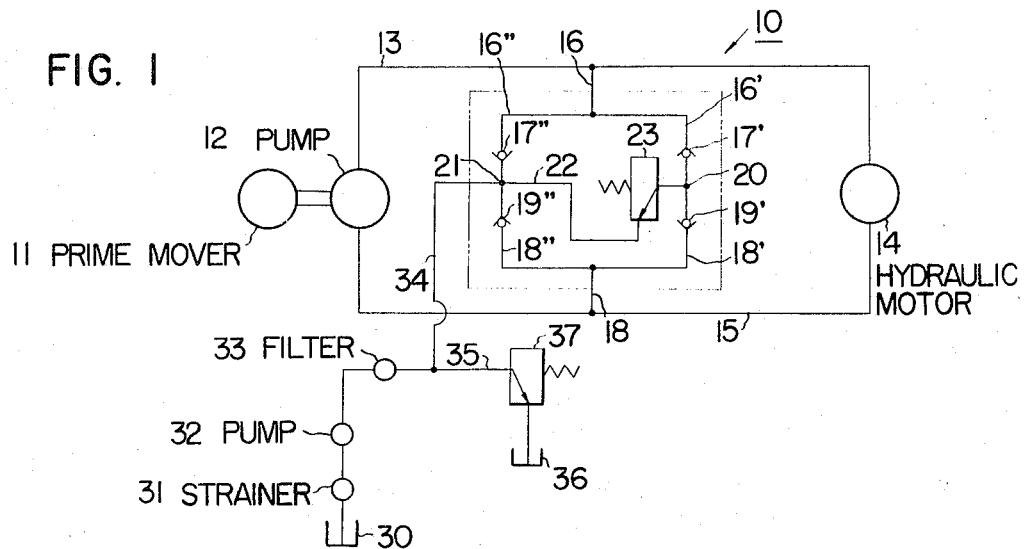
FIG. 1 is a schematic diagram of one example of the hydraulically operated power system according to this invention.

Referring now to FIG. 1, a hydraulically operated power system according to this invention is schematically illustrated and generally designated by the reference numeral 10. This power system 10 comprises a suitable prime mover 11 operatively connected to a pump 12 which is adapted to pump hydraulic fluid for the purpose hereinafter described. The delivery side of the pump 12 is connected through a supply line 13 to a hydraulic motor 14 adapted to be driven by the pressurized hydraulic fluid. The motor 14, which may be any type of well known hydraulically operated motor, is connected through a return line 15 to the pump 12.

At an intermediate part of the supply line 13, there is connected a branch line 16, which branches into two branch lines 16', 16". The branch line 16' has a check valve 17' inserted therein and the branch line 16" has a check valve 17" inserted therein. The check valve 17' allows the fluid flow from line 16 to pass therethrough but prevents the flow toward the line 16, and the check valve 17" allows fluid flow toward the line 16 to pass therethrough but prevents the flow from the line 16.

At an intermediate part of the return line 15 there is connected a branch line 18 which branches into two branch lines 18' and 18". The branch lines 18' and 18" have check valves 19' and 19" inserted therein, respectively. The check valve 19' allows fluid flow from the line 18 to pass therethrough but prevents the flow toward the line 18, and the check valve 19" allows fluid flow toward the line 18 to pass therethrough but prevents the flow from the line 18.

The branch lines 16' and 18' meet at junction 20, and likewise the branch lines 16" and 18" at junction 21. A line 22 extends between the points 20 and 21 and has inserted thereon a relief valve 23 having a pilot valve provided with a vent port. The relief valve 23, when operated, allows fluid flow from the point 20 to the point 21.

There is further provided a fluid reservoir tank 30 which is connected through a strainer 31 to the suction side of a fluid make-up pump 32. The delivery side of the pump 32 leads through a filter 33 and through a line 34 to the point 21. From the line 34, a line 35 extends to a reservoir tank 36, the line 35 having therein a relief valve 37.

The hydraulic power system 10 shown in FIG. 1 operates as follows. When the prime mover 11 is driven, the pump 12 is operated to feed pressurized hydraulic fluid through the supply line 13 to the hydraulic motor 14 so as to drive the latter. The fluid after leaving the motor returns through the return line 15 to the suction side of the pump 12.

The above described operation occurs when the relief valve 23 does not allow communication from the point 20 to the point 21. The hydraulic pump 12 and hydraulic motor 14 rotate with coupled relationship, but if the rotation of the hydraulic motor 14 is obstructed by an external force during the rotation of the pump 12, or if the motor 14 is caused by an external force to rotate in spite of the fact that the pump 12 is being prevented from rotating, and the high pressure produced within the supply line 13 exceeds the preset pressure value of the relief valve 23, the pressured fluid will pass through the branch line 16' and the check valve 17' to open the relief valve 23 and then, flowing into the line 22. will flow through lines 18" and 18 to escape into the return line 15, thereby preventing the development of abnormal pressure. However, when the relief valve 23 is operated, as will hereinafter be described in detail, to permit communication between the points 20 and 21, the hydraulic fluid flows through the lines 16 and 16' and through the relief valve 23 to the line 18" and 18 and then flows through the return line 15. Thus, since fluid pressure sufficient for coupling the hydraulic pump 12 and the hydraulic motor 14 is not produced within the supply line 13, the hydraulic pump 12 and the hydraulic motor 14 are free to rotate or stop without any mutual interrelation.

The compensation for the released amount of the hydraulic fluid, or the make-up of the hydraulic fluid which corresponds to the released amount, is effected by feeding the fluid from the reservoir 30 by the action of the make-up pump 32, through the strainer 31, filter 33, line 34, branch lines 16″ or 18″, and branch lines 16 or 18 to the supply line 13 and the return line 15. In this case the excess fluid is permitted to escape from line 35 into reservoir tank 36 through open relief valve 37.

Figure 2:
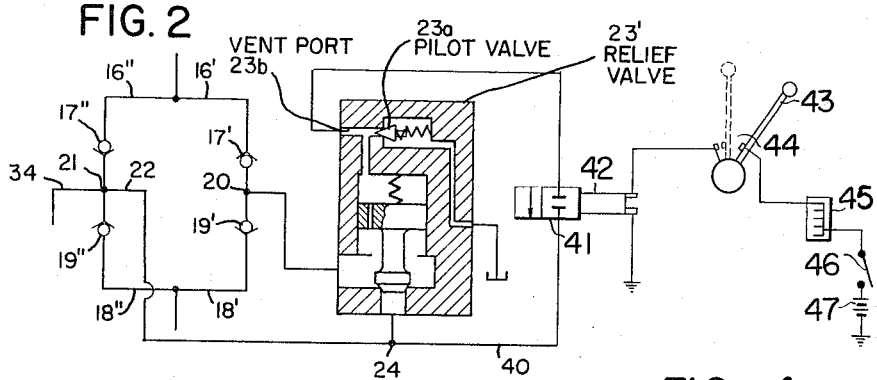
FIG. 2 is a schematic diagram of a control system of the power system according to this invention.

In FIG. 2, there is illustrated a control system to be employed in the power system of FIG. 1. The same reference numerals in FIG. 2 as in FIG. 1 designate the same components or elements as in FIG. 1. The relief valve 23′, corresponding to relief valve 23 of FIG. 1, and having a pilot valve 23a associated with a vent port 23b, is connected at its vent port, to a control line 40, which has a change-over valve 41 inserted therein, and is also connected to the line 22 at junction 24. The valve 41 has a solenoid 42 for the operation thereof and is adapted to be opened when the solenoid 42 is energized.

One terminal of the solenoid is grounded (earthed) as shown, and the other terminal thereof is connected to a fixed contact of a control switch 44, which has a movable contact attached to a control lever 43. When the control lever 43 is in the position shown by solid lines, the control switch 44 is opened and, when the control lever 43 is in the position shown by broken lines, the control switch 44 is closed. The movable contact of the switch 44 is connected through a terminal board 45, a main switch 46 and a power source 47 to ground.

This lever 43 is for controlling the rotational speed of the pump driving prime mover 11. Its position indicated by solid lines is that for increased rotational speed, and its position indicated by dotted lines is that corresponding to the minimum speed at which the prime mover 11 can rotate, for example, the idling speed in the case of an internal combustion engine.

That is, the control switch 44 is a switch which is opened and closed in coupled operation with the above mentioned lever 43 for prime mover control, and is closed only when the lever 43 is in the position indicated by dotted lines. At other positions of the lever 43 for raising the speed, that is, at positions displaced from the dotted line position toward the solid line position, the control switch is opened.

Thus, when the control lever 43 is placed in the dotted line position, the switch 44 is closed, whereby the solenoid 42 is energized and causes the change-over valve 41 to assume its open state. The pressure within the relief valve 23′ becomes zero or a very low value, even if the preset pressure is not reached. Since both sides of this relief valve then become open, the high pressure on the side of the supply line 13 is transmitted through the branch lines 16 and 16′, check valve 17′, relief valve 23′, and line 22 to the side of the return line 15. Then, since no pressure is produced in the supply line 13, the prime mover 11 is caused to undergo low-speed rotation by the placing of the lever 43 in the dotted line position and, even if the hydraulic pump 12 is rotating, the motor 14 will stop rotating if a slight external force is applied. Furthermore, if the motor 14 is actuated by an external force when the rotation of the prime mover 11 is stopped, and the hydraulic pump 12 is placed in a stopped state, the motor can be freely rotated without restraint by the fluid pressure within the pipe line.

When the control lever 43 is moved to the solid line position, the rotational speed of the pump driving prime mover rises and, at the same time, the contact of the switch 44 is opened, whereby the solenoid 42 is rendered inactive, and the relief valve 23′ assumes the closed state. Consequently, the fluid pressure on the side of the supply line 13 rises, and the hydraulic motor 14 and the hydraulic pump 12 are coupled together thereby to rotate simultaneously at any time within the limit established by the preset pressure of the relief valve 23′.

When the main switch 46 is placed in the open state, the solenoid 42 is not energized even if the lever 43 is in its dotted line position, the result being the same as that when the lever 43 is in its solid line position. Consequently, the relief valve 23 is in the closed state and, even if an external force such as to cause rotation of the hydraulic motor 14 is applied, the motor 14 will not move, being fully stopped.

Accordingly, by the practice of the present invention it is possible, by means of a system of simple construction, to cause the operative effect of the pressure fluid from the hydraulic pump 12 to act effectively on the hydraulic motor 14 or be diminished.

That is, when, in the case of a vehicle employing a hydraulic drive, the vehicle is positively stopped without stopping the rotation of the prime mover 11, and the lever 43 is moved from the solid line position to the dotted line position, the prime mover is caused by the above-mentioned action to rotate at the minimum speed. At the same time, the solenoid 42 is energized, whereby pressure is no longer produced in the supply line 13, and fluid pressure for driving the vehicle becomes zero. Consequently, the vehicle stops as the prime mover 11 maintains its idling state as it rotates.

Thereafter, when the operator stops the prime mover and is about to leave the vehicle, he opens the main switch 46, whereupon the solenoid is released and returns to the original state, and the vehicle is thereby placed in a braked state.

Therefore, when the vehicle is to be stopped at places such as a sloping roadway, positive and safe braking is effected merely by opening the main switch.

Figure 3:
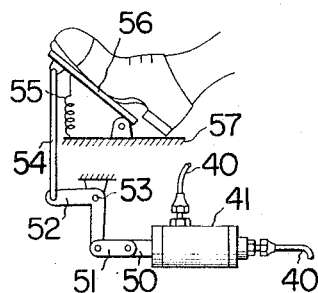
FIG. 3 is a diagrammatic view illustrating modified operating means for operating a change-over valve which is used in the control system of FIG. 2.

FIG. 3 shows modified means for operating the change-over valve 41 of the control system. In this example, the change-over valve 41 has an operating rod 50, the end of which is pin connected to one end of a link 51, whose other end is pin connected to one end of a bell crank 52 pivotally supported at its central portion at 53. The bell crank 52 has another end articulated to the lower end of a connecting rod 54, which has the upper end thereof pin connected to the free end of a pedal 56. This pedal 56 is pivotally supported at its base end on a suitable floor 57 and is always urged upwardly by a spring 55.

When the pedal 56 is depressed against the force of the spring 55, the operating rod 54 is caused to move downwardly, thereby causing counter clockwise rotation of the bell crank 52, which results in rightward movement (as viewed in FIG. 3) of the operating rod 50, thereby causing the valve 41 to be opened.

The opening of the valve allows the flow of the hydraulic fluid therethrough, whereupon the relief valve 23′ is opened and permits the escape of the pressure within the line 13. Consequently, the coupling between the pump 12 and the motor 14 is broken, and the pump and motor becomes free to move separately, whereby it becomes possible to stop the motor 14 even if the pump 12 is rotating.

When the pedal 56 is released, it returns to its uppermost position thereby causing the valve 41 to be closed through the members 50, 51, 52, and 54. This results in closing of the relief valve 23′ and creation of pressure in the line 13, whereby, within the preset pressure of the relief valve 23′, the pump and motor assume a constantly coupled state, and the hydraulic motor is rotated by the rotation of the hydraulic pump, as previously described.

Figure 4:
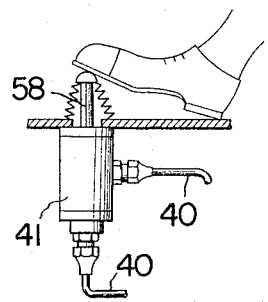
FIG. 4 is a diagrammatic view illustrating another modified operating means.

FIG. 4 shows another modified means for operating the change-over valve 41 of the control system. In this example, the change-over valve 41 is directly operated by depressing a spring-urged operating rod 58 extending upwardly from the valve.

While preferred embodiments of this invention have been shown and described hereinbefore, it is to be understood that this invention is not intended to be limtied thereto but may be modified or changed without departing from the spirit and scope of this invention as set forth in the appended claims.

What I claim is:

1. A hydraulically operated power system comprising: a prime mover; a hydraulic pump driven by said prime mover; a hydraulic motor; a supply line for supplying hydraulic fluid from said pump to said motor; a return line for returning the hydraulic fluid from said motor to said pump; branch lines branching from said supply and return lines and communicating with a hydraulic fluid reservoir; check valves, and a relief valve having a pilot valve provided with a vent port, inserted in said branch lines; a change-over valve for controlling the communication between the two sides of said relief valve; and means to operate said change-over valve; said relief valve being adapted to permit flow of hydraulic fluid from said supply line through said branch lines to said return line, in order to bypass fluid around said motor, when said change-over valve is opened, whereby said motor is rendered free to stop or rotate irrespective of the rotation of said prime mover, and being adapted to block fluid flow from said supply line through said branch lines to said return line, for supplying all the fluid delivered from said pump to said motor in order to drive said motor, when said change-over valve is closed.

2. The hydraulically operated power system as defined in claim 1, wherein said change-over valve is electromagnetically operated, and including a device providing for the excessively supplemented pressure fluid to escape into a fluid reservoir.

3. The hydraulically operated power system as defined in claim 1, wherein said change-over valve is operated by means of a pedal through a suitable mechanism.

4. The hydraulically operated power system as defined in claim 1, wherein said change-over valve is adapted to be directly operated by the operator.

5. A hydraulically operated power system comprising: a prime mover; a pump driven by said prime mover; a hydraulic motor; a supply line for supplying hydraulic fluid from said pump to said motor; a return line for returning the hydraulic fluid from said motor to said pump; first and second branch lines branching from said supply line and including first and second check valves, respectively, said first and second check valves permitting the fluid to flow from and toward the supply line, respectively; third and fourth branch lines branching from said return line and including third and fourth check valves, respectively, said third and fourth check valves permitting the fluid to flow from and toward the return line, respectively, said first and third branch lines meeting at a first junction and said second and fourth lines meeting at a second junction, a connecting line connected between said first and second junctions, a relief valve inserted in said connecting line, means for operating said relief valve, said means including a change-over valve for controlling the communication between the two sides of said relief valve, and a relief line communicating with said second junction and connected to a line communicating with a fluid reservoir.

6. The hydraulically operated power system according to claim 2 wherein the electromagnetic operation of the change-over switch is controlled by a switch provided on and actuated by a lever for controlling the rotational speed of the prime mover for driving the hydraulic pump, said switch being closed when said lever is at its position for minimum speed operation of the prime mover and being opened when said lever is at a position for a speed of operation higher than said minimum speed operation.

7. The hydraulically operated power system according to claim 5 wherein said change-over valve is operated by an electromagnetic means which is controlled by a switch provided on and actuated by a lever for controlling the rotational speed of the prime mover for driving the hydraulic pump, said switch being closed when said lever is at its position for minimum speed operation of the prime mover and being opened when said lever is at a position for a speed of operation higher than said minimum speed operation.

References Cited by the Examiner
UNITED STATES PATENTS

| | | |
|---|---|---|
| 2,008,687 | 7/1935 | Dean. |
| 2,330,739 | 9/1943 | Piron. |
| 2,374,909 | 5/1945 | Williams _____ 60—52 X |
| 2,961,829 | 11/1960 | Weisenbach _____ 60—53 |
| 3,003,309 | 10/1961 | Bowers et al. _____ 60—53 X |

EDGAR W. GEOHEGAN, *Primary Examiner.*